Figure 1:
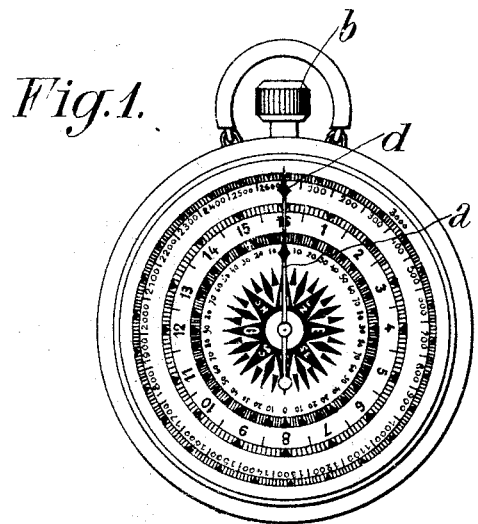

Feb. 21, 1933.     W. A. LOTH     1,898,091

SYSTEM OF ACOUSTIC SIGNALING

Original Filed Dec. 27, 1923

Inventor
W. A. Loth
By Marks Clerk
Attys.

Patented Feb. 21, 1933

1,898,091

UNITED STATES PATENT OFFICE

WILLIAM ARTHUR LOTH, OF PARIS, FRANCE, ASSIGNOR TO SOCIÉTÉ INDUSTRIELLE DES PROCÉDÉS W. A. LOTH, OF PARIS, FRANCE

SYSTEM OF ACOUSTIC SIGNALING

Application filed December 27, 1923, Serial No. 683,089, and in France January 4, 1923.
Renewed December 12, 1931.

It is known that ships mutually signal their approach in foggy weather, by means of apparatus causing vibrations in air or water, or by wireless telegraphy. Usually, use is made either of the steam whistle or of the bell. These signals approximately indicate on board a ship the relative position and direction of another ship by taking as a basis the direction of the sound. But neither the distance of the vessel nor its course can be determined in this way. This latter information is indispensable if it is desired to avoid collisions. It has been proposed to send out code signals, which indicate the course followed by the vessel sending them. A single long blast or stroke is made for the first quadrant of the compass card (0° to 90°), two for the second, three for the third, and four for the fourth. Then as many short blasts or strokes are made as there are quarters between the direction followed by the vessel and the entrance line of the quadrant in which it navigates; this measurement being effected clockwise. This remarkably simple system is essentially based on the relative values of two signals, one of which is long (two seconds, for instance) and the other short (one second, for instance). It compels, however, the observer to exactly differentiate the signals, in order to read the communication they denote according to the code adopted. It would be advantageous to diminish the time necessary for the production of the signal and to avoid the difficulties of differentiation of signals of different durations.

It has likewise been proposed to employ watches or chronographs for determining the period of time elapsing between signals received on board a vessel. Thus, apparatus of this kind has been made comprising a needle capable of adjustment about a graduated circle comprising two successive scales, one for determining the duration of sending of a signal and the other for ascertaining, by the position of the needle, the distance of the sending vessel.

This apparatus does not permit of the determination of the direction of the sending vessel, so that it is impossible to ascertain by successive readings, the course followed by that vessel. This information is, however, indispensable if absolute security be desired, for only thereby can it be known whether the courses followed by the two vessels cross, and, if so, at what point.

The present invention has for its object improved apparatus by means of which the direction and distance of a vessel sending signals can be determined at the same time, so that by successive readings, various positions occupied by said vessel can be ascertained and, consequently, the exact course followed can be determined.

With this object in view, the apparatus comprises two index hands capable of being independently operated by the mechanism of a well known chronometer and of being adjusted with respect to three concentric scales which are respectively graduated in degrees, seconds and distance, the apparatus comprising also the points of the compass centrally arranged.

Figures 2, 3:
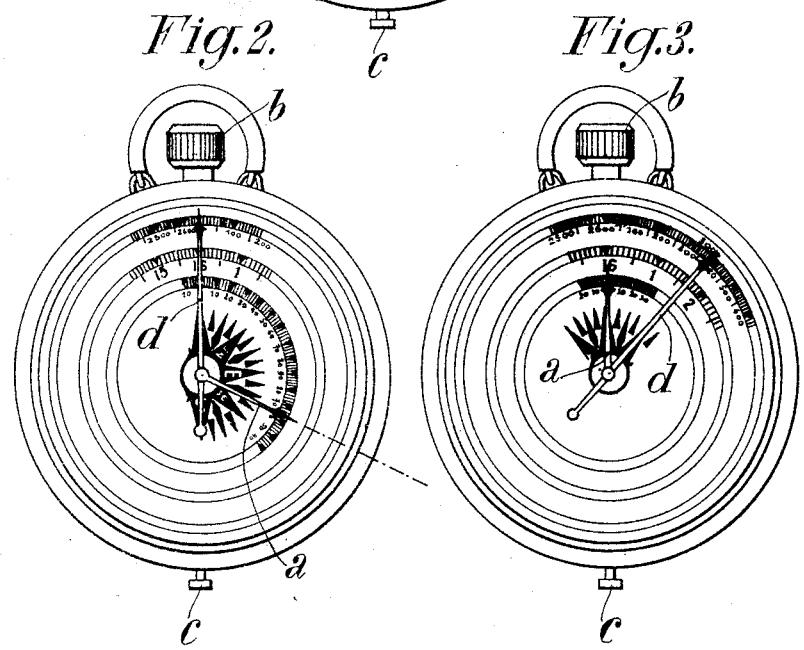

In the accompanying drawing, by way of example, Fig. 1 illustrates apparatus according to the invention in a position of rest and Figs. 2 and 3 are similar views showing portions only of the scales indicating respectively a direction and distance of a signaling vessel.

The chronometer construction is substantially the same as shown in the U. S. Patents No. 151,899, June 9, 1874; No. 143,619, October 14, 1873, and 377,897, February 14, 1888.

In utilizing this apparatus, the conditions are as follows:

A signal, which may be a blast with the whistle, for example, is made on board the first vessel. The signal is continued for a conventional period, for example four seconds. At the time this signal ends, the operator presses on the push button $b$, so that the hand $a$ begins to rotate. At the moment this hand makes an angle with the initial zero position equal to the angle between the ship's course and the north-south line, the hand $a$ is stopped (Fig. 2) by pressing a second time on the push button $b$ and a second signal is made by the blast of the whistle, for example. Simultaneously, the hand $d$ is allowed to rotate by pressing on button $c$, and continues its movement until the moment of receipt of a reply-signal sent by the neighboring vessel. This signal has been emitted when the operator on board this vessel has heard the end of the second signal, so that the said reply-signal enables the pilot of the first vessel to determine the distance of the invisible vessel, because, at the time the reply-signal is noted, the hand $d$ is stopped by pressing a second time on the push button and this hand indicates upon the outer scale on the dial the distance to the invisible vessel.

It is obvious, in fact, that the distance between the two vessels is proportional to the time which elapses between the end of the emission of the second signal, and the reception of the reply-signal, since the sound (for example) has travelled twice the distance separating the first vessel from the second one. Finally, a last signal is emitted at the same time as the hand $d$ is stopped, that is to say when the reply-signal of the second vessel is heard.

The signaling vessel has thus made known its own course and at the same time has determined the distance at which the invisible vessel is to be found.

On board the second vessel, the first signal continuing for four seconds, as indicated, is noted. At the moment the signal ceases, hand $a$ is set in motion by pressing on the push button $b$ and is stopped by pressing a second time on the said push button $b$ as soon as the second blast of the whistle indicating the course is noted. The hand $a$ determines on the scale in degrees the angle which the course of the first vessel makes with the north-south line. At the same time, the operator sets in motion the hand $d$, by pressing on the push button $c$, and this hand continues its movement until the last signal of the first vessel is heard. At this time, the hand $d$ indicates the distance between the two vessels.

The operations can be repeated by the two vessels, which are now in possession of the indications as to course and distance. By proceeding to a plurality of successive determinations, it is possible to ascertain the various relative positions of the vessels and to trace their respective courses.

The problem is, therefore, completely solved and collision avoided seeing that, on board each vessel, the crossing point of the courses is known and consequently it is possible to manoeuvre to avoid any near approach.

It is evident that the operations described are independent of the nature of the signals which may be audible (in the air or under water), electro-magnetic, magnetic and so on.

Having now described my said invention I declare that what I claim is:

1. Apparatus for use in signaling between vessels comprising a dial provided with the points of the compass and three concentric scales respectively graduated in degrees, seconds, and distance, and two needles on a common pivot capable of independent angular displacement by a chronometric movement over said dial.

2. Apparatus as claimed in claim 1 in which the zero point of the three scales is located on the north-south line of the compass.

3. Apparatus as claimed in claim 1 in which the angular displacement of one of the needles around the chronometric graduation enables the durations of the succession of signals to be determined and enables the direction of the signaling vessel with respect to the north-south line to be determined by the displacement around the scale in degrees.

4. Apparatus as claimed in claim 1, in which the angular displacement of one of the needles during the interval of time between an emission of a signal and the reception of the reply signal enables the distance between the sending vessel and the answering vessel to be read off on the distance scale.

5. Apparatus adapted for use in signaling the course of a craft comprising a dial provided with a circumferential scale divided angularly, a circumferential scale divided into time units, a circumferential scale divided into distance units corresponding to times elapsed for the travel of a specific type of signal, and two needles on a common pivot capable of independent angular displacement by chronometric movement over said dial.

6. Apparatus adapted for use in signaling the course of a craft comprising a dial provided with a circumferential scale divided angularly, a circumferential scale divided into time units, and a needle capable of angular displacement by chronometric movement over said dial.

7. Apparatus adapted for use in signaling the course of a craft comprising a dial provided with a circumferential scale divided angularly, a circumferential scale divided into distance units, and two needles mounted on a common pivot capable of independent angular displacement by chronometric movement over said dial.

In testimony whereof I have signed my name to this specification.

WILLIAM ARTHUR LOTH.